K. E. PEILER.
ART OF CONVEYING MOLTEN GLASS.
APPLICATION FILED MAY 18, 1912. RENEWED FEB. 17, 1916.
1,199,108.
Patented Sept. 26, 1916.
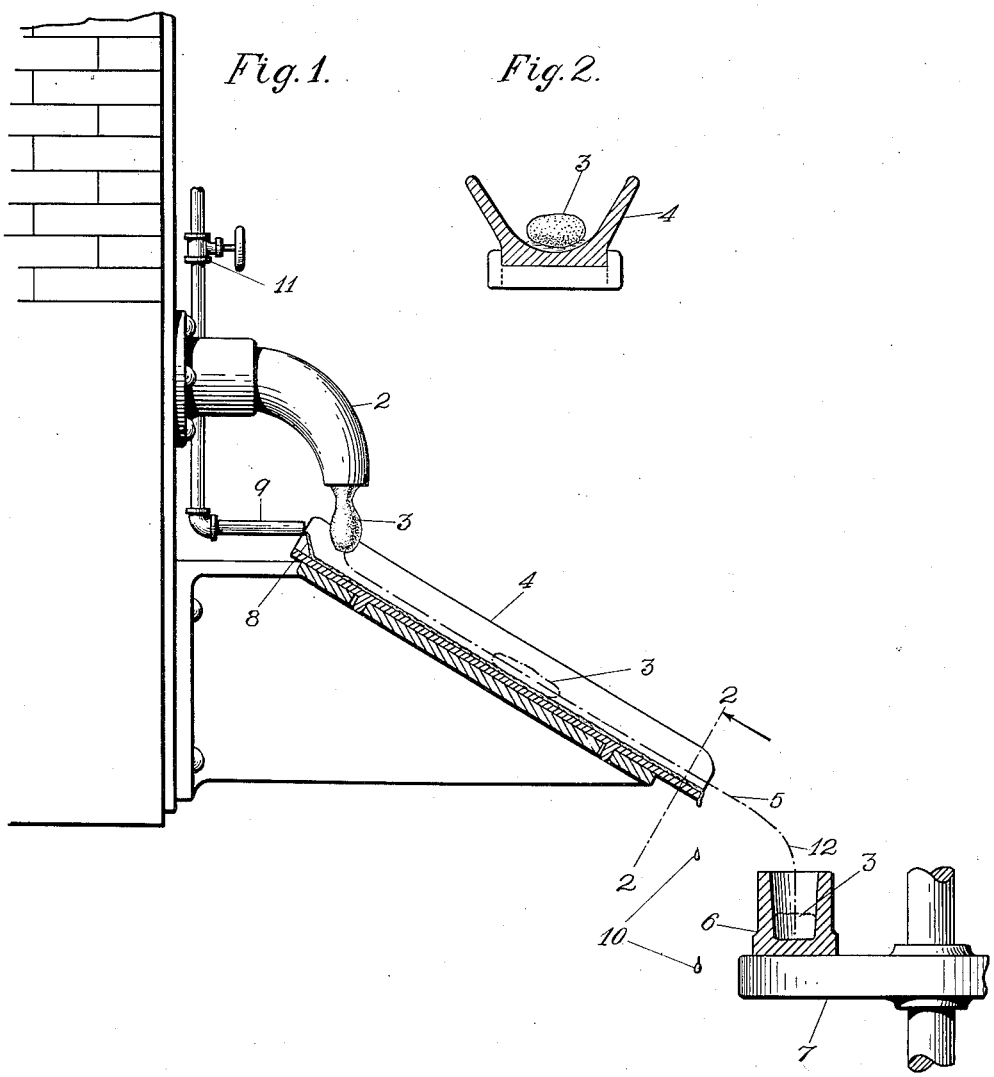
Witnesses:
S. S. Grotta
E. H. Lorenz
Inventor:
Karl E. Peiler
by Wm H Honiss
Atty.

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

ART OF CONVEYING MOLTEN GLASS.

1,199,108. Specification of Letters Patent. Patented Sept. 26, 1916.

Application filed May 18, 1912, Serial No. 698,201. Renewed February 17, 1916. Serial No. 78,963.

*To all whom it may concern:*

Be it known that I, KARL E. PEILER, a citizen of the United States, residing at Hartford, in the county of Hartford and State of Connecticut, have invented new and useful Improvements in the Art of Conveying Molten Glass, of which the following is a specification.

This invention relates to the art of feeding, or conveying molten glass from a furnace, melting chamber, crucible, pot, or other source of supply or container of molten glass to molds, presses, blowing apparatus or other means employed for shaping glass into commercial or usable form.

On account of the inherent viscosity, and other peculiar properties of molten glass it is difficult to handle and convey it rapidly and uniformly by the methods, processes and implements to which other molten substances are amenable, especially after the glass has been severed in detached masses from its stream or source of supply. It flows and rolls slowly, is rapidly chilled and easily scarred by contact with the air and with gathering tools and other handling and transporting implements. If the latter are heated enough to prevent this chilling action, then the molten glass is liable to adhere to the heated surfaces, clogging and interfering with their proper action besides interfering with the regularity and uniformity of delivery of the masses or gathers of glass to their shaping devices. Undue, and especially unequal, chilling of the glass also affects its plasticity, making it more difficult to shape, and causes scars in the finished product. Moreover, the pulling away of the molten glass from a surface to which it adheres causes the formation of glass threads and slivers, which are liable to injure the shaping molds or other implements, and to become embedded in the ware being produced. Besides the importance of thus feeding and conveying the molten glass without chilling, or scarring of its surface, and without having it adhere to the conveying surfaces, it is of great importance to transfer or transport it rapidly and uniformly as to time and quantity, from its melting pot or furnace to its shaping instrumentalities, so as to reduce to a uniform minimum the time of transit, thus avoiding loss of heat by radiation in the air, as well as avoiding the chilling and scarring effect of mechanical contact with the surfaces of the conveying medium. This rapid and uniform delivery of the molten glass enables the shaping implements to act upon the glass while it is as nearly as possible in the uniformly plastic condition in which it leaves the melting pot or furnace. It is moreover generally desirable to have the press, or blowing machine, or other shaping instrumentality a comfortable distance away from the intense heat of the melting pot or furnace, which further increases the difficulty of conveying the molten glass rapidly and without allowing it to become unduly or unevenly chilled or scarred in transit.

The object of this invention therefore is to provide a simple, inexpensive and effective method of thus conveying glass in a molten state, especially when in separated masses, smoothly, uniformly and rapidly, without impairing the quality, or the shaping properties of the glass by chilling, or scarring, or otherwise, and without adhering to the conduit or other conveyer employed.

Broadly speaking, the invention consists in conveying the molten glass from a suitable outlet of the pot or furnace to a mold or other shaping implement, through or along a conduit, the glass conveying surface of which is provided with and protected and insulated by a fluid film or coating upon and along which the molten glass, whether in separated masses or in a stream, slides or glides smoothly, freely and swiftly, and is thus projected rapidly from the outlet to the mold or other receiving or shaping implement, thereby insuring a quick and uniform delivery to the molds or other shaping means in the right condition to effect the best results and uniformly produce perfect articles of glassware.

A convenient way of applying or producing the fluid film upon the conveying surface of the trough, pipe, or other conduit, is to wet or moisten it with a liquid which vaporizes at a temperature lower than that of the molten glass, as for example water, various oils and greases, or hydrocarbons. The fluid may be supplied to the conduit or conveyer either intermittently or continuously, by occasional immersions in the liquid, or by flowing, dropping, or spraying the liquid upon or along its glass conveying surface, in which case the conduit or a lining thereof may be made of metal, stone, wood, or other substantially non-porous or impervious material. Or the film may be produced by allowing the liquid to percolate or filter or seep through the pores of a pervious material employed for the conduit or its lining, which in this case may be made of Portland cement, unglazed porcelain, or terra cotta, along and through which the water or other liquid may flow, distribute and percolate in sufficient quantity, so that the evaporation thereof shall produce and maintain at the surface of the conduit a suitable fluid film upon and along which the molten glass is supported and conveyed.

The accompanying drawings illustrate an approved way in which this invention may be utilized. In this embodiment the glass is illustrated as being fed in separated masses, although it may obviously be employed for the feeding of a continuous stream.

Figure 1 is a side elevation showing the outlet of a melting tank or furnace, and a trough or conduit conveying the delivered drops or masses of molten glass from the outlet to a mold on the mold table of a press, the conduit and the mold being shown in cross-section. Fig. 2 is an enlarged view of the trough or conduit in section taken on the line 2—2 of Fig. 1.

The glass is delivered from the spout or outlet 2 of a furnace, pot, or other reservoir, in a continuous flow, or by successive intermittent pulsations, from which predetermined drops or masses 3 may be severed in any well-known or convenient way. The glass falls upon the film-protected surface of the conduit or conveyer 4, along which it is projected toward its destination. In this instance, the conveyer is inclined so that the glass slides by gravity, the approximate center of its mass following the general course indicated by the line 5 into the mold or other shaping implement or receiver 6, resting upon a table or other mold carrying or supporting surface 7. A stream of water 8 is represented as flowing from the pipe 9 along the surface of the trough. Any surplus water reaching the end of the conveyer unevaporated drops from the end of the conveyer as indicated at 10. The flow of water may be regulated in any convenient way, as by means of a valve 11.

The heat of the molten glass vaporizes a sufficient quantity of the water or other liquid to produce a film having the density and other characteristics required for forming the desired separating, insulating and lubricating medium between the molten glass and the surface of the conveyer, upon which the molten glass slides or glides smoothly and swiftly from the melting tank or furnace to the shaping instrumentalities.

The vaporizing effect of the heat of the molten glass may be modified somewhat by the radiation or convection of heat from the furnace or tank, depending upon the proximity of the furnace, and the character of its walls, or the presence, or lack of insulation. These, and other modifying conditions which may exist should be taken into account in adapting this invention to use under various conditions. If the conduit is liable to be overheated by these or other causes, as for example, by the rapid or continuous feeding of large quantities of glass, its heat may be regulated by suitably modifying the temperature or the quantity of the water or other liquid supplied to the conduit. Or the conduit may be provided with a cooling chamber, through which a tempering medium is circulated, either by a supply from the pipe 9, or from an independent supply. In these, and in many other ways, the practice of this invention may be modified to adapt it to various requirements or conditions of service.

The relative position of the outlet and the mold or other receiving or shaping instrumentality should be adapted to the various conditions of service, depending upon the directions in which the glass drops or is expelled from the outlet, and upon the distance through which the glass is to be conveyed. The conduit may be disposed so as to convey the glass along a path of movement which under its momentum, whether acquired by its initial impulse from the outlet, or acquired by gravity, shall propel it through a trajectory 12, which extends beyond the end of the conveying surface of the conduit, so as to deliver the glass centrally into the mold or other receptacle, as shown in Fig. 1. This permits the conveying surface of the conduit to be terminated short of the mold, if desired, for suitable clearance; and also permits any excess of moisture to drop from the end of the conduit down past and clear of the mold, instead of accompanying the glass into the mold or other receptacle.

The conduit may be straight as herein shown, or it may be curved in any way suitable for adapting it to guide and convey the glass with a suitable velocity and through the desired path.

I claim as my invention:—

1. The method of conveying molten glass to shaping apparatus, which consists in sliding the glass in a continuing plastic condition upon and along a film of fluid.

2. The method of conveying molten glass in continuing plastic condition to shaping apparatus, which consists in flowing the glass in an unconfined plastic condition upon and along a conduit thinly lined with a lubricating film of fluid.

3. The method of conveying molten glass in continuing plastic condition to shaping apparatus, which consists in floating free masses of the plastic glass upon and along a film of fluid.

4. The method of conveying molten glass in continuing plastic condition, which consists in floating free separated gathers of the plastic glass upon and along a film of fluid.

5. The method of conveying molten glass in a continuing plastic condition, which consists in moistening the inclined surface of a conduit and sliding the molten glass by gravity upon and along the moistened inclined surface.

6. The method of conveying molten glass, which consists in providing an inclined conduit, flowing liquid along the inclined surface and sliding the molten glass by gravity upon and along the moistened inclined surface.

7. The method of conveying molten glass in continuing plastic condition, which consists in separating the glass into detached masses or gathers, dropping them in an unconfined condition upon a supporting film of fluid, and sliding them along the said film.

8. The method of rapidly conveying molten glass a substantial distance while it remains in a molten condition in a path having a minimum inclination from the horizontal which consists in dropping the glass upon the inclined surface of a conduit protected by a fluid film.

9. The method of conveying molten glass to a mold which consists in projecting the glass along a trajectory part of which is defined and supported by a fluid film and the remainder of which is unsupported.

10. The method of conveying molten glass to a mold, which consists in projecting the glass along a trajectory guided part way by a fluid film and continuing unguided through the air, utilizing the momentum of the glass to complete its trajectory through the air.

11. The method of conveying molten glass, which consists in projecting the glass along a trajectory supported part way by a fluid film, and utilizing the momentum of the glass to carry it beyond the fluid film through the unsupported portion of its trajectory.

12. The method of conveying molten glass, which consists in projecting the glass along a fluid film supported by a guiding conduit and utilizing the momentum of the glass to carry it beyond the fluid film.

13. The method of conveying molten glass, which consists in sliding it by gravity along the wet surface of a conduit, supplying the conduit surface with liquid in excess of the amount vaporized by the glass, and utilizing the momentum of the glass to carry it beyond the wet surface of the conduit, whereby the excess liquid may drain away from the glass.

14. The method of conveying molten glass to a mold, which consists in sliding the glass along the moistened surface of a conduit extending toward but not to the mold, leaving a gap across which the glass is carried by its momentum, and is freed from the moisture of the conduit.

In testimony whereof I have signed my name to this specification in the presence of two subscribing witnesses this 17 day of May, 1912.

KARL E. PEILER.

Witnesses:
  EDWARD H. LORENZ,
  WILLIAM A. LORENZ.